(12) United States Patent
Kushwaha et al.

(10) Patent No.: US 11,706,093 B2
(45) Date of Patent: *Jul. 18, 2023

(54) AUTO SWITCHING FOR ENTERPRISE FEDERATED NETWORK SLICE

(71) Applicant: Cisco Technology, Inc., San Jose, CA (US)

(72) Inventors: Manoj Kumar Kushwaha, Karnataka (IN); Bindiganaville Jagadish Rajesh, Karnataka (IN); Jayantilal Govindlal Agrawal, Karnataka (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/569,871

(22) Filed: Jan. 6, 2022

(65) Prior Publication Data
US 2022/0131756 A1 Apr. 28, 2022

Related U.S. Application Data

(63) Continuation of application No. 17/069,494, filed on Oct. 13, 2020, now Pat. No. 11,265,220.

(51) Int. Cl.
*G06F 15/16* (2006.01)
*H04L 41/0896* (2022.01)
(Continued)

(52) U.S. Cl.
CPC ...... *H04L 41/0896* (2013.01); *H04L 41/0627* (2013.01); *H04L 41/12* (2013.01);
(Continued)

(58) Field of Classification Search
CPC . H04L 41/0896; H04L 41/0627; H04L 41/12; H04L 41/5096; H04L 43/0852; H04L 43/0876; H04L 47/805
(Continued)

(56) References Cited

U.S. PATENT DOCUMENTS 10,439,958 B2    10/2019   Cui et al.
10,506,489 B2    12/2019   Vrzic
(Continued)

FOREIGN PATENT DOCUMENTS

GB        2577527 A       1/2020

OTHER PUBLICATIONS

3GPP, "3rd Generation Partnership Project; Technical Specification Group Services and System Aspects; Telecommunication management; Study on management and orchestration of network slicing for next generation network (Release 15)", 3GPP TR 28.801 V15.1.0, Jan. 2018, 75 pages.

(Continued)

*Primary Examiner* — Moustafa M Meky
(74) *Attorney, Agent, or Firm* — Edell, Shapiro & Finnan, LLC

(57) ABSTRACT

A method in which an enterprise switches its devices to various federated network slices across operators based on cost, time, quality, and/or availability parameters defined in flexible rules managed by the enterprise. The method includes obtaining, by a controller of an enterprise, one or more parameters of a device served by a network slice of a core network. The method further includes, based on the one or more parameters of the device and one or more rules, determining, by the controller, whether a triggering event associated with a slice reselection occurred and based on the triggering event and the one or more rules, selecting, by the controller, a federated network slice from among a plurality of network slices provided by a plurality of core networks. The method further includes the controller causing the device to switch from the network slice to the federated network slice.

20 Claims, 8 Drawing Sheets

(51) Int. Cl.
*H04L 41/50* (2022.01)
*H04L 41/12* (2022.01)
*H04L 47/80* (2022.01)
*H04L 43/0852* (2022.01)
*H04L 43/0876* (2022.01)
*H04L 41/0604* (2022.01)

(52) U.S. Cl.
CPC ...... *H04L 41/5096* (2013.01); *H04L 43/0852* (2013.01); *H04L 43/0876* (2013.01); *H04L 47/805* (2013.01)

(58) Field of Classification Search
USPC ......................................................... 709/223
See application file for complete search history.

(56) References Cited

U.S. PATENT DOCUMENTS

| | | | | |
|---|---|---|---|---|
| 10,785,655 | B2 * | 9/2020 | Xu | H04W 84/00 |
| 10,979,955 | B2 | 4/2021 | Vrzic | |
| 11,134,370 | B2 * | 9/2021 | Lee | H04W 28/24 |
| 11,240,720 | B2 * | 2/2022 | Shih | H04W 76/27 |
| 11,265,220 | B1 * | 3/2022 | Kushwaha | H04L 43/20 |
| 11,330,499 | B2 * | 5/2022 | Chun | H04W 48/02 |
| 2017/0086118 | A1 | 3/2017 | Vrzic | |
| 2017/0289791 | A1 * | 10/2017 | Yoo | H04W 68/005 |
| 2018/0248815 | A1 | 8/2018 | Cui et al. | |
| 2018/0332442 | A1 | 11/2018 | Shaw et al. | |
| 2018/0352491 | A1 * | 12/2018 | Shih | H04W 76/27 |
| 2019/0053147 | A1 | 2/2019 | Qiao et al. | |
| 2019/0124544 | A1 | 4/2019 | Shaw et al. | |
| 2019/0223093 | A1 | 7/2019 | Watfa et al. | |
| 2019/0261184 | A1 * | 8/2019 | Xu | H04L 67/12 |
| 2019/0349774 | A1 | 11/2019 | Lou et al. | |
| 2019/0357130 | A1 | 11/2019 | Garcia Azorero et al. | |
| 2020/0036652 | A1 | 1/2020 | Cui et al. | |
| 2020/0059842 | A1 | 2/2020 | Vrzic | |
| 2020/0187088 | A1 * | 6/2020 | Chun | H04W 48/02 |
| 2020/0367109 | A1 | 11/2020 | Chen et al. | |
| 2020/0404479 | A1 * | 12/2020 | Lee | H04W 60/00 |
| 2021/0092020 | A1 | 3/2021 | Maguire et al. | |
| 2021/0136674 | A1 | 5/2021 | Lee et al. | |
| 2021/0289436 | A1 * | 9/2021 | Hu | H04W 28/04 |
| 2021/0385726 | A1 * | 12/2021 | Kobayashi | H04L 45/22 |

OTHER PUBLICATIONS

Affirmed Networks, "VSSF Solution Brief", downloaded Oct. 13, 2020, 4 pages.

* cited by examiner

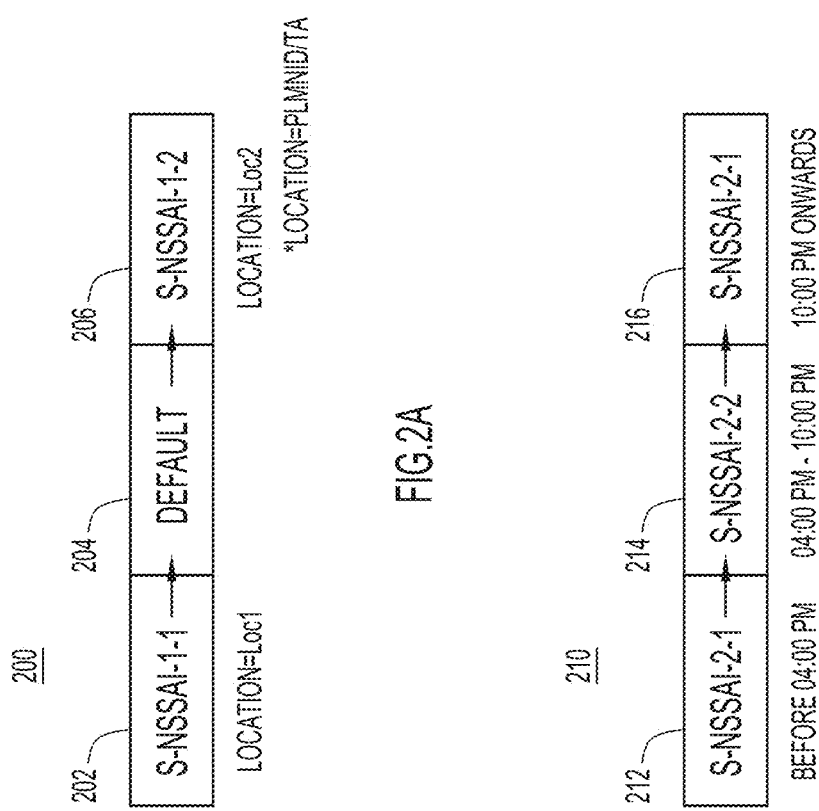

AUTO SWITCHING FOR ENTERPRISE FEDERATED NETWORK SLICE

CROSS REFERENCE TO RELATED APPLICATION

This application is a Continuation Application of U.S. patent application Ser. No. 17/069,494, filed Oct. 13, 2020, the entirety of which is incorporated herein by reference for all purposes.

TECHNICAL FIELD

The present disclosure relates to networking, and more particularly to network switching for network slices.

BACKGROUND

With the advent of Fifth Generation (5G) networks, millions of Internet-of-Things (IoT) devices and other devices are using 5G network slices. A 5G network slice is an independent virtualized network tailored to a particular service quality. As the number of connected devices increases, efficient management of communication resources becomes more critical. Enterprises are becoming quality and cost sensitive. In trying to provide a reliable network for an uninterrupted service, efficient and adaptive utilization of the network slices is needed. There are significant challenges in managing various network slices and ensuring that they meet the required service level agreements (SLAs).

BRIEF DESCRIPTION OF THE DRAWINGS

FIGS. 2A-2D are diagrams illustrating a rule-based network slice switching, according to various example embodiments.

DESCRIPTION OF EXAMPLE EMBODIMENTS

Overview

Figure 1:
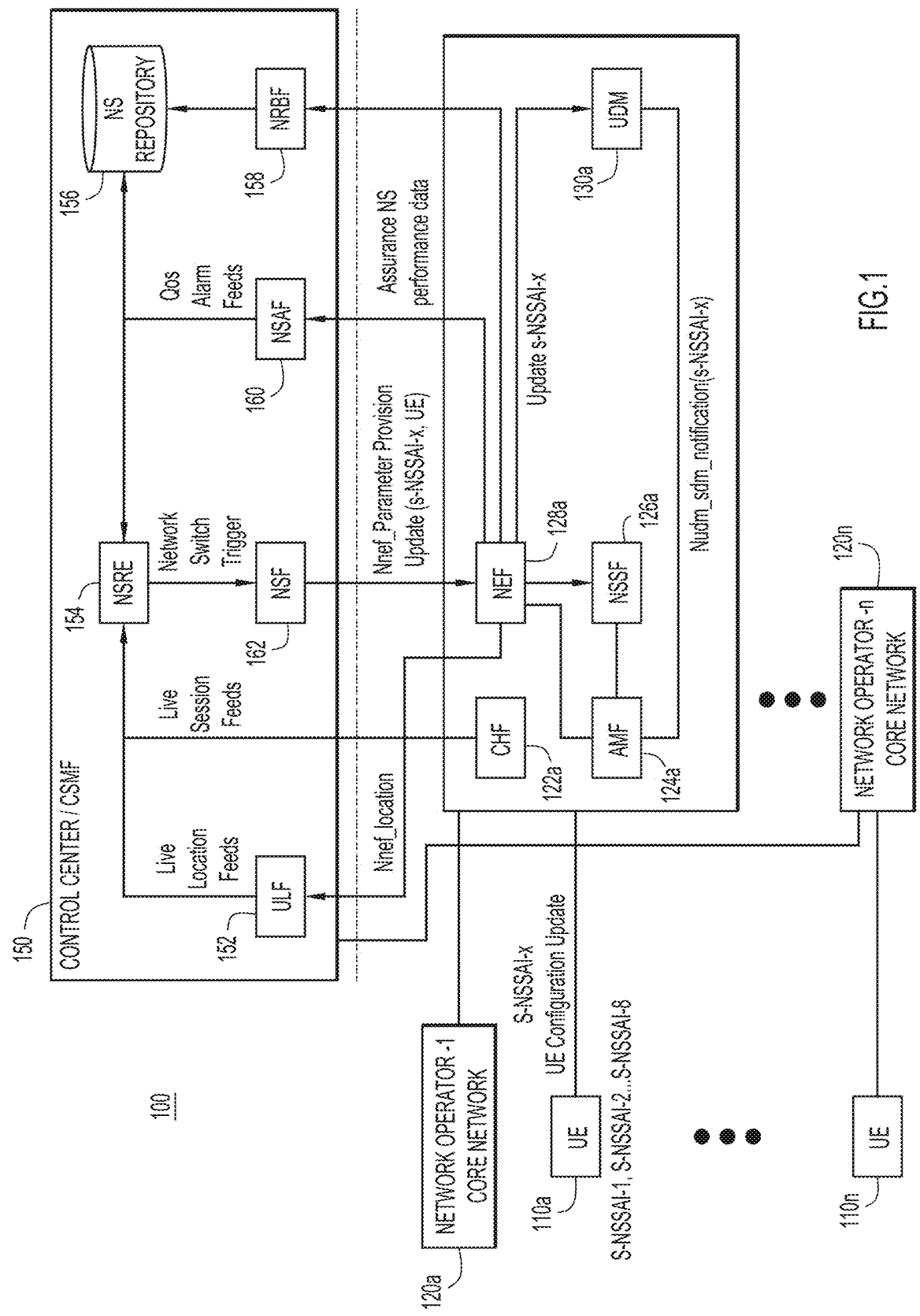
FIG. 1 is a block diagram illustrating an architecture in which one or more federated network slices are deployed, according to an example embodiment.

Briefly, methods are provided for switching a device to a federated network slice based on rules pre-configured by an enterprise. In these methods, a controller of an enterprise obtains one or more parameters of a device served by a network slice of a core network. Based on the one or more parameters of the device and one or more rules, the controller determines whether a triggering event associated with a slice reselection occurred. Based on the triggering event and the one or more rules, the controller selects a federated network slice from among a plurality of network slices provided by a plurality of core networks and causes the device to switch from the network slice to another network slice (the federated network slice).

Example Embodiments

Example embodiments provide for an adaptive and optimized usage of network slices. Enterprises bundle up network slices of various network operators and switch among them based on various rules. The enterprises build federated network slices of various types that are accessible across various network operators at different locations. Accordingly, enterprises are able to switch network slices for millions of their devices as per their business needs at different points in time.

For example, a mining company that moves from one location to another location every few months needs the same Quality of Service (QoS) service at all locations. Similarly, a freight service company that has connected vehicles moving to different locations needs the same QoS service at all locations. By generating federated network slices using location-based rules, the mining company and the freight service company are able to obtain the same QoS at all locations.

As another example, an event management team e.g., for a music concert, needs to provide a high throughput resilient network to stream/broadcast a live event for a specific period of time. Analogously, an Augmented Reality (AR)-Virtual Reality (VR) game, or an online game needs high throughput resilient network for a specified time interval. By generating federated network slices using time-based rules, the event management team and the gaming event are able to obtain a resilient network with high throughput for the specific time interval.

As another example, emergency responders need a reliable network during an emergency phase, thereby maintaining highest QoS is necessary. By generating federated network slices using QoS-based rules, the emergency responders are provided with a reliable network with the required QoS.

To accommodate enterprises in the above-examples and provide for dynamic changes in the network slice selection across operators, continuous monitoring of devices is required and deep integration with an operator's core network. This additionally involves continuous tracking and conciliation of changes with network slice repositories across operators based on different QoS, location, and time parameters. Enterprises set up rules for network slice switching for their devices.

Techniques presented herein are provided for enterprises to create federated slices across operators and allow devices to move to a network slice based on cost, time, quality, and availability parameters without any manual intervention.

A communication service management function (CSMF) builds a repository of network slices based on different slice type. This repository is periodically synchronized across various network operators and is organized based on network slice availability associated with location, time, and/or QoS levels. In this method, the slices are switched based on flexible rule definitions managed by the enterprises. These rules may be based on location, time, and/or QoS.

The techniques accommodate various user devices, IoT devices, and embedded subscriber identification module (e-SIM) operated devices. For example, a device is monitored and changes in a state of the device are tracked based on real-time parameters such as location, time, and/or current network slice. When a rule condition is met, an action for changing the network slice in the core network is triggered. The rule may include cost, quality, and availability parameters.

FIG. 1 is a block diagram illustrating an architecture 100 in which one or more federated network slices are deployed, according to an example embodiment. The architecture 100 includes devices or user equipment (UEs) 110a-n, core networks 120a-n of various network operators, and a communication service management function (CSMF) 150. The reference numeral suffix "a-n" is intended to denote that the number of components may vary based on a particular deployment of the architecture 100.

The UEs 110a-n may be, but are not limited to, mobile devices, mobile terminals or stations, internet of things (IoT) devices, consumer devices such as a personal digital assistant (PDA) or a smart phone, a personal computer such as a notebook or a desktop computer. The IoT device may include communication equipment, smart appliances, commercial security systems, sensors, industrial systems, and so on. While only two UEs 110a and 110n are depicted in FIG. 1, one of ordinary skill in the art would readily appreciate that different numbers of UEs may be present in the architecture 100 depending on a particular configuration.

The UE 110a is connected to a core network 120a provided by a first network operator and the UE 110n is connected to another core network 120n provided by the nth network operator.

The core networks 120a-n may include any mobile communication network such as 4G/LTE networks and/or 5G cellular public and/or private networks. In FIG. 1, the first core network 120a and the nth core network 120n are 5G networks provided by different network operators. The core network 120a includes a Charging Function (CHF) 122a, an Access and Mobility Management Function (AMF) 124a, a Network Slice Selection Function (NSSF) 126a, a Network Exposure Function (NEF) 128a, and a unified data management (UDM) repository 130a.

The CSMF 150 may be at an enterprise control center or is cloud-based such that its components or services are provided in a cloud (spread across various remote physical servers, for example). The CSMF 150 may be a network controller, a control center, or a digital network architecture controller (DNAC) of an enterprise. The CSMF 150 is a layer above the core networks 120a-n.

The CSMF 150 includes UE Location Function (ULF) 152, a Network Slice Rule Engine (NSRE) 154, a Network Slice Repository (NS Repository) 156, a Network Repository Builder Function (NRBF) 158, a Network Slice Alarm Function (NSAF) 160, and a Network Switch Function (NSF) 162. These components may implement the techniques described herein.

In the core network 120a, the CHF 122a allows charging services to authorized network functions and provides live session feeds to the NSRE 154 of the CSMF 150.

The AMF 124a provides functionality similar to that of a Mobility Management Entity (MME) of a 4G/LTE network and is responsible for handling connections and mobility management tasks. The AMF 124a interfaces with the UE 110a to obtain and provide information. For example, the AMF 124a uses the NSSF 126a to assist with a selection of a network slice for the UE 110a and provides the selection to the UE 110a. The selection of a network slice is provided by the CSMF 150 via the NEF 128a. The AMF 124a also receives connection and session related information from the UE 110a and provides it to the NEF 128a, which may then communicate it to the ULF 152 and/or the NSAF 160 of the CSMF 150.

The NSSF 126a determines the allowed network slice based on the information from the CSMF 150 via the NEF 128a. The network slice is identified using single-network slice selection assistance information (S-NSSAI).

The components of the core network 120a may be defined by 3GPP Technical Specifications (TSs) or Technical Report (TR) 28.801 V15.1.0, dated January, 2018 and further description is omitted for the sake of brevity. While only these components of the core network 120a are provided, one of ordinary skill in the art would readily appreciate that other components may be included in the core network 120a.

In the CSMF 150, the ULF 152 is a listener component that listens for any location changes of the UE 110a received from the NEF 128a of the core network 120a. The ULF 152 provides (pushes) the location changes to the NSRE 154 for any rule triggers.

The NSRE 154 is a function that executes one or more rules defined by an enterprise based on triggering of an event change (Location, Time, and/or QoS). The NSRE 154 receives the current network slice being used by the UE 110a from the CHF 122a as live session feeds. The NSRE 154 further receives (a) QoS information from the NSAF 160 based on the performance parameters of the UE 110a provided by the core network 120a and (b) location changes from the ULF 152. Based on location, time, and/or QoS, the NSRE 154 determines whether to communicate with the NSF 162 to trigger a network slice switch. If a slice switch is triggered, the NSF 162 communicates a new network slice and an identifier of the UE 110a to the NEF 128a. The NEF 128a updates the UDM 130a. The UDM 130a then sends an update with the new network slice information to the AMF 124a. The AMF 124a, in its turn, instructs the UE 110a to switch to the new network slice.

The NS Repository 156 stores all available network slices of various core networks 120a-n. The NS Repository 156 is configured based on cost, quality, slice type, and/or location. Since the NS Repository 156 includes a collection of network slices available at different core networks 120a-n, the network slices are called federated network slices. The federated network slices are available for enterprise users across various operators.

The NRBF 158 is a component that aids in collecting and synchronizing numerous network slices of various core networks 120a-n into the NS Repository 156 and prioritizing the same based on business criticality. The NRBF 158 is a builder function that obtains information about various available network slices by communicating with each of the core networks 120a-n such as the NEF 128a of the core network 120a.

The NSAF 160 is a listener/assurance component that listens and/or detects any change in performance parameters (bit rate, data volume, latency and/or capacity) of the UEs 110a-n and/or the network slices that service the UEs 110a-n. The NSAF 160 monitors the QoS obtained by the UEs 110a-n. For example, the NEF 128a provides the performance parameters or network slice performance metrics to the NSAF 160. The NSAF 160 determines the QoS of the network slice based on these performance parameters and compares it to a QoS threshold. When the calculated QoS of the network slice is below the QoS threshold, a QoS alarm feed is provided to the NSRE 154 to serve as a triggering event for a network slice change.

The NSF 162 receives a new network slice (NSSAI) determined by the NSRE 154 (as part of rule triggering) and propagates the same to the NEF 128*a* to trigger a switch to the federated network slice for the UE 110*a* using the AMF 124*a*.

Next, use case examples are provided in which a federated network slice is selected based on location, time, and/or QoS, according to various example embodiments. A table, shown below, provides a list of available network slices stored in the NS Repository 156.

| S-NSSAI ID | Operator ID | Location ID | Slice Type |
|---|---|---|---|
| S-NSSAI-1-1 | Operator-X | PLMNID-1 | mIoT |
| S-NSSAI-1-2 | Operator-Y | PLMNID-2 | mIoT |
| S-NSSAI-1-3 | Operator-Z | PLMNID-3 | mIoT |
| S-NSSAI-2-1 | Operator-X | PLMNID-1 | eMBB |
| S-NSSAI-2-2 | Operator-Y | PLMNID-2 | eMBB |
| S-NSSAI-2-3 | Operator-Z | PLMNID-3 | eMBB |

In this table, slices are identified using a slice identifier such as a single NSSAI (S-NSSAI). A network operator is identified using an operator identifier (ID), a location is indicated using a location ID, and a slice type is indicated using a standard slice type identifier. By way of an example and not by way of a limitation, the location ID maybe in a form of a series of numbers that identify a public land mobile network (PLMN) and/or a tracking area (TA). The slice type, by way of an example and not by way of a limitation, may include three standard slice types: a massive IoT (mIoT) type, an enhanced mobile broadband (eMBB) type, and a low latency type such as Ultra Reliable Low Latency Communications (URLLC).

FIGS. 2A-2D illustrate diagrams 200-230, respectively, depicting rule-based network slice switching, according to various example embodiments. The switching is implemented by the CSMF 150 and one or more of the core networks 120*a-n* of FIG. 1. The federated network slices for the switching are selected based on the table described above and stored in the NS Repository 156.

In FIG. 2A, the diagram 200 illustrates switching to a federated location-based network slice, according to an example embodiment. For example, the UE 110*a*, associated with an Enterprise E1, is moving from a Location 1 (Loc1) e.g. San Jose, to a Location 2 (Loc2) e.g. New York, in a roaming scenario. At 202, the UE 110*a* is serviced by the network slice (NSSAI-1-1) of a type mIoT. The requirement is for a device of the Enterprise E1 to switch to a similar or a better network slice when it moves to the Location 2 (Loc2). Locations may be identified using the PLMNID-1/TA.

When the UE 110*a* moves to the Location 2 (Loc2), at 204, the UE 110*a* switches over to a default network slice available with a partner or a federated operator. The ULF 152 detects this change in location of the UE 110*a*. Accordingly, the ULF 152 provides the location change to the NSRE 154 for a better slice (with the same slice type) identification and switching process. The NSRE 154 executes the enterprise rule, which may schematically be depicted as follows:

---

Enterprise-1 (E1) -> { s-NSSAI-1-1, s-NSSAI-1-2 }
Enterprise-2 (E2) -> { s-NSSAI-1-1, s-NSSAI-1-2, s-NSSAI-1-3 }

---

Location Rule-x -> {
IF ( E1.Dx.Loc= Loc1 ),
then s-NSSAI=s-NSSAI-1-1
ELSE ( E1.Dx.Loc= Loc2 )
then s-NSSAI=s-NSSAI-1-2
}

---

The NSRE 154 obtains available network slices such as the ones shown in the table above, from the NS Repository 156. Based on the table and the rule, at 206, the NSRE 154 instructs the NSF 162 to switch the UE 110*a* to a federated network slice identified as NSSAI-1-2. The UE 110*a* is then switched from the default network slice to a federated location-based network slice identified as NSSAI-1-2, which is of the same or better slice type.

Figure 2C:
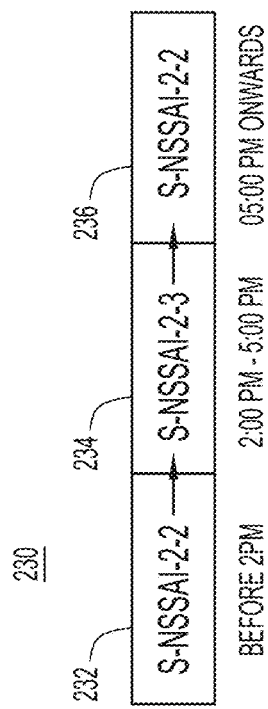

In FIGS. 2B and 2C, diagrams 210 and 230 illustrate switching to a federated time-based network slice, according to various example embodiments. In diagrams 210 and 230, the UE 110*a* is switched to the federated network slice for a predetermined period of time.

For example, the Enterprise E1 may want a device to be serviced by a particular slice/service type for a specific period of time and then switched back to the old or previous network slice when the time period expires. That is, a live music concert or a gaming event is to occur at a specific time for a predetermined duration. For the duration of the concert and/or event, the Enterprise E1 configures the NSRE 154 with a rule that the devices at the event are to be switched to an eMBB slice type for streaming i.e., to guarantee that the streamed content (both picture and sound) has very high quality. When the event finishes, the devices are to be switched back to their original or default slices.

The NSRE 154 executes the enterprise rule, which may schematically be depicted as follows:

---

Time Rule -y = {
IF (E1.D1.T between [ T1 : T2 ] ) // Event Time Range defined in the Rule of enterprise E1 for device D1at a time T
then s-NSSAI=s-NSSAI-2-2
ELSE // Event is completed so back to the Original NS
then s-NSSAI=s-NSSAI-2-1 // default network slice
}

---

At 212, the UE 110*a* is serviced by the network slice S-NSSAI-2-1 before the start of an event. Based on the table and the rule, at 214, the UE 110*a* is switched to the network slice S-NSSAI-2-2 at the start of the event i.e., at the Time (T1)—4:00 μm. The UE 110*a* is serviced by the network slice S-NSSAI-2-2 throughout the event until the event finishes i.e., Time (T2)—10:00 pm. At 216, after time (T2)—10:00 pm, the UE 110*a* is switched back to the slice S-NSSAI-2-1.

In diagram 230, the event occurs between 2:00 pm (T1) and 5:00 pm (T2). Accordingly, at 232, the UE 110*a* is serviced by the network slice S-NSSAI-2-2. At 234, the UE 110*a* is switched to a slice S-NSSAI-2-3. The slice S-NSSAI-2-3 may be of type eMBB providing high throughput for the duration of the event. At 236, after T2, the UE 110*a* is switched back to the network slice S-NSSAI-2-2.

Figure 2D:
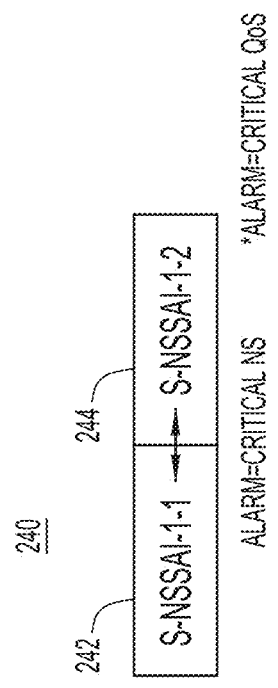

In FIG. 2D, diagram 240 illustrates switching to a federated QoS-based network slice, according to an example embodiment. When the current network slice is experiencing high latency, low capacity, and/or low bandwidth and is not able to meet the SLA defined for enterprise devices, a network slice switching is executed to meet the SLA requirements. This may be particularly applicable in time critical enterprise networks such as hospitals and/or for other emergency services.

At 242, the UE 110a is serviced by a network slice S-NSSAI-1-1. Assurance network slice performance data is provided to the NSAF 160 via the NEF 128a of the core network 120a. When a set QoS threshold is breached, the NSAF 160 provides a QoS alarm feed to the NSRE 154. The NSRE 154 triggers a switch to a pre-configured network slice of the same or different operator based on a rule regarding QoS or an SLA assurance rule. Specifically, at 244, the UE 110a is switched to a federated network slice S-NSSAI-1-2.

According to various example embodiments, the UEs 110a-n may be stationary or mobile devices. The UEs 110a-n may be provisioned with profiles for connecting or attaching to various core networks provided by different network operators or service providers. These profiles include user subscription information and network settings as it relates to a particular network operator. The combination of user subscription information and the network settings allows the UEs 110a-n to connect to a network (cellular and/or data network). These profiles are typically stored in subscriber identity modules (SIMS) of the UEs 110a-n. SIMS are cards that may be inserted into the UEs 110a-n or may be in an electronic form, i.e., an embedded SIM card (eSIM). A standard SIM device stores one profile that allows the device to connect with one core network of a single network operator. An eSIM device has more than one profile such that it can be controlled to select, at any given time, from among different network providers supported by respective eSIM profiles.

Figure 3A:
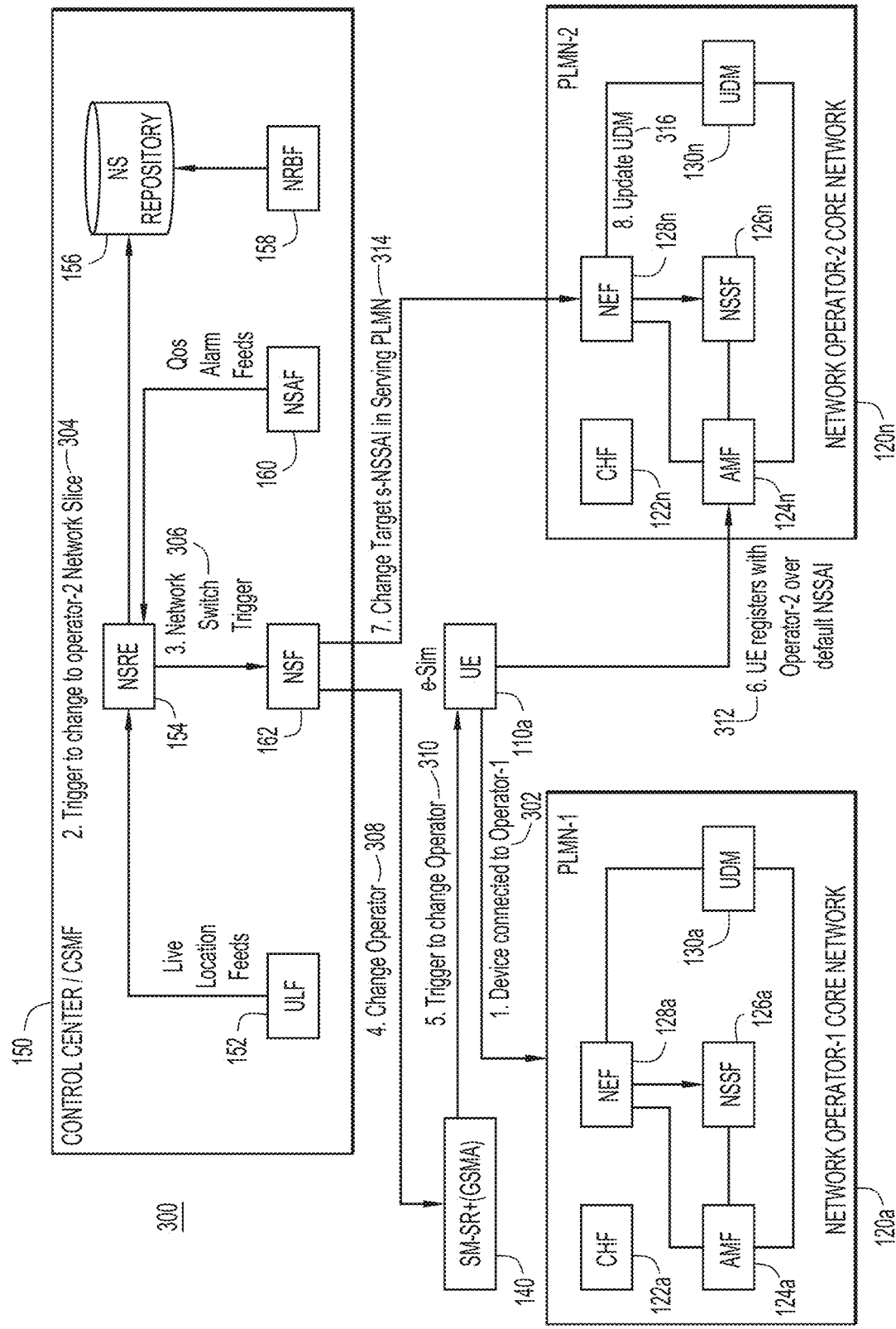
FIG. 3A is a flow diagram illustrating a non-roaming slice switching of an embedded Subscriber Identity Module (e-SIM) device based on a triggering event, according to an example embodiment.

FIG. 3A is a flow diagram 300 illustrating a non-roaming slice switching of an e-SIM device based on a triggering event, according to an example embodiment. In addition to the UE 110a, the core networks 120a-n provided by different network operators, and the CSMF 150, a subscription manager secure routing (SM-SR) service 140 is provided to help facilitate non-roaming slice switching for the e-SIM devices.

The SM-SR service 140 (defined by a Global System for Mobile Communications Association (GSMA)) enables secure download, enablement, disablement, or deletion of profiles from an eSIM of the UE 110a based on instructions from the CSMF 150. An embedded universal integrated circuit card (eUICC) or eSIM may be provisioned remotely over-the-air (OTA) with various SIM profiles across multiple networks from a central management point such as the CSMF 150. The SM-SR service 140 ensures secure transport of profile management commands such as loading a new profile, enabling, disabling, and deleting a profile on the eSIM of the UE 110a.

The core network 120n includes analogous components to the components of the core network 120a described above in FIG. 1. Specifically, the core network 120n includes CHF 122n, AMF 124n, NSSF 126n, NEF 128n, and UDM 130n.

In FIG. 3A, at 302, the UE 110a is connected to the core network 120a. The core network 120a is a first public land mobile network (PLMN) provided by the first network operator.

At 304, the NSRE 154 triggers to change to a different network operator i.e., to the core network 120n based on any of the trigger condition like location, time, or QoS. For example, the UE 110a migrated to a different location serviced by the core network 120n, the second PLMN. The below use case is applicable for both roaming and non-roaming scenarios.

At 306, the NSRE 154 instructs the NSF 162 to switch the UE 110a to the core network 120n.

At 308, the NSF 162 requests the SM-SR service 140 to change the network operators.

At 310, the SM-SR service 140 triggers the UE 110a to change network operator and connect to the core network 120n. That is, the SM-SR service requests that the UE 110a disables a first profile associated with the core network 120a and enables a second profile associated with the core network 120n.

At 312, the UE 110a registers with the core network 120n and is served by a default network slice of the core network 120n. Based on the foregoing, the NEF 128n may notify the ULF 152 about the new location of the UE 110a. The ULF 152 provides the location feed to the NSRE 154. The NSRE 154 may determine, based on the enterprise rules, that the UE 110a needs to be switched to a different network slice (target s-NSSAI).

At 314, the NSF 162 provides to the NEF 128n information about the UE 110a and the federated network slice selected by the NSRE 154 to serve the UE 110a in the core network 120n.

At 316, the NEF 128n updates the UDM 130n with the selected federated network slice to serve the UE 110a. Based on this update, the UE 110a is triggered via the AMF 124n to switch to the selected federated network slice.

Figure 3B:
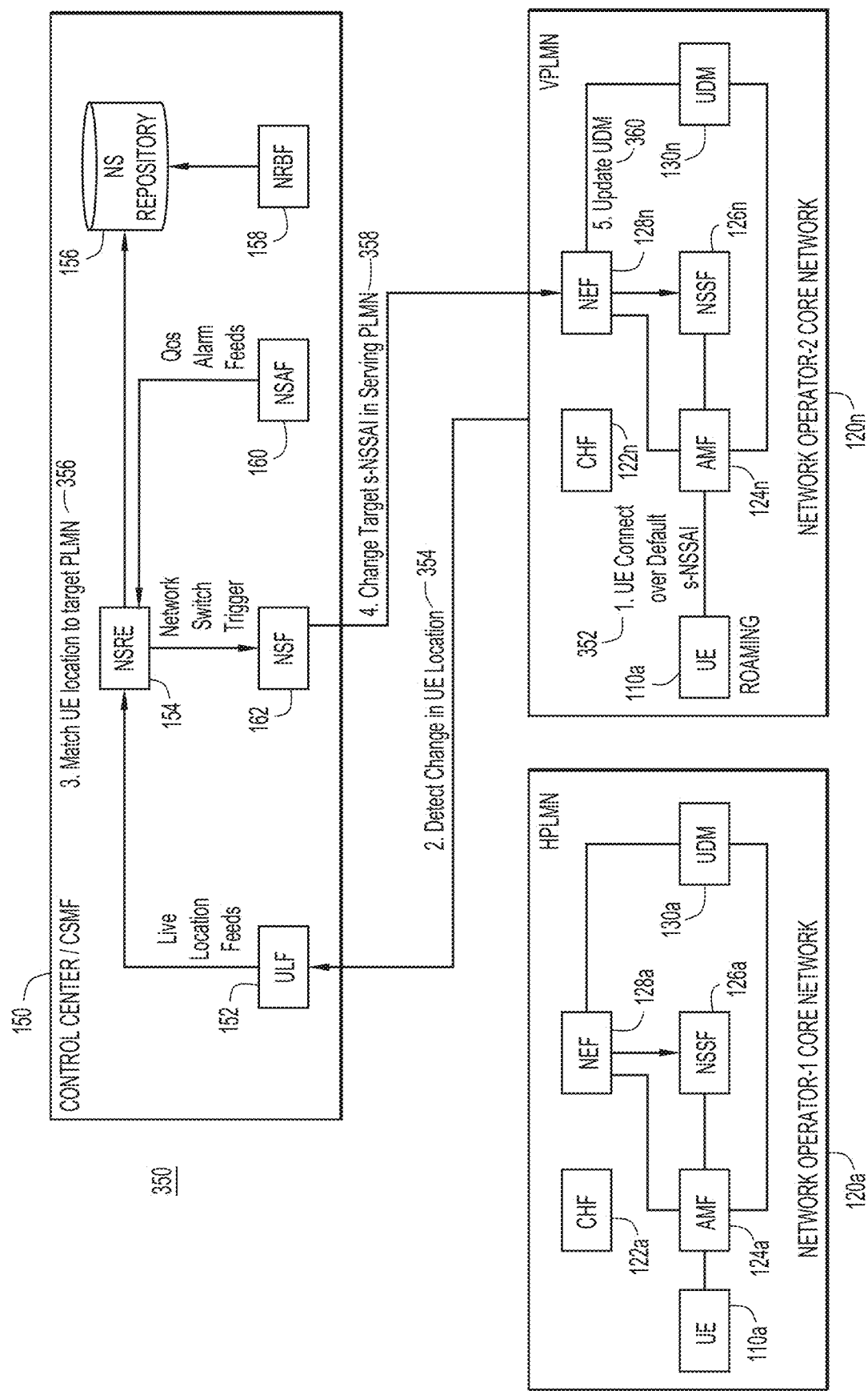
FIG. 3B is a flow diagram illustrating a method of a standard SIM device switching to a federated network slice in a roaming scenario based on a triggering event, according to an example embodiment.

FIG. 3B is a flow diagram 350 illustrating an event flow for a roaming slice switching of a device based on a triggering event, according to another example embodiment. The technique extends to any of UEs 110a-n including standard SIM devices. In FIG. 3B, the core network 120a is a home PLMN (HPLMN) and the nth core network 120n is a visited PLMN (VPLMN).

At 352, the UE 110a connects to the core network 120n and is served by a default network slice (default s-NSSAI).

At 354, the ULF 152 detects a location change of the UE 110a based on a location update provided by the NEF 128n. The ULF 152 then provides the live location feed (location change) of the UE 110a to the NSRE 154.

At 356, the NSRE 154 matches the new location of the UE 110a to a target federated network slice based on one or more location-based rules. For example, the target network slice s-NSSAI is provided by a different core network (the core network 120n—VPLMN). Information about various federated network slices available to the UE 110a is obtained from the NS Repository 156.

At 358, the NSRE 154 triggers the NSF 162 to request a switch from the default network slice s-NSSAI to a target network slice s-NSSAI in the core network 120n. Information about the selected federated network slice and the UE 110a is provided to the NEF 128n.

At 360, the NEF 128n updates the UDM 130n with information about the target s-NSSAI to serve the UE 110a. Based on this update, the UE 110a is switched from the default network slice (default s-NSSAI) to the target network slice (target s-NSSAI) using the AMF 124n.

While above example embodiments are provided using location-based rules, it is not limited thereto. The NSRE 154 may trigger the UE 110a to change to a federated network slice provided by same operator based on time information and/or based on QoS information. The time-based rules and/or the QoS-based rules will cause the UE 110a to switch to a selected federated network slice without first being served by a default network slice shown in FIGS. 3A and 3B.

Figure 4:
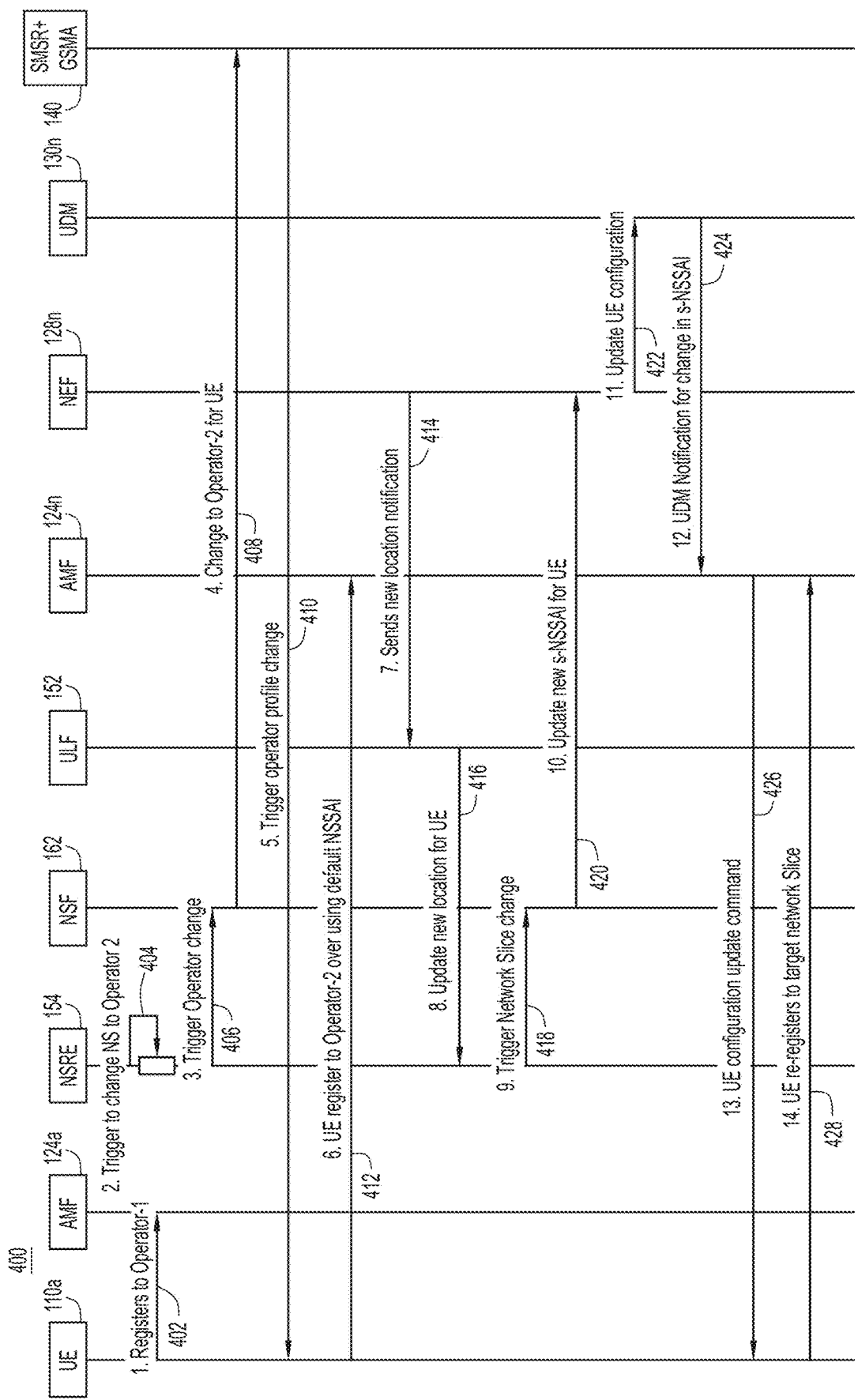
FIG. 4 is a call flow diagram for a method of an e-SIM device switching to a federated network slice in a non-roaming scenario, according to an example embodiment.

FIG. 4 is a call flow diagram 400 illustrating a non-roaming network slice switching for e-SIM device, according to an example embodiment. In FIG. 4, the non-roaming slice switching is performed by the UE 110a, the core networks 120a and 120n provided by different network operators, the CSMF 150, and the SM-SR service 140 of FIG. 3A.

At 402, the UE 110a registers with a first core network 120a via the AMF 124a and is served by one of the network slices of the first core network 120a.

At 404, the NSRE 154 of the CSMF 150 triggers switching of the UE 110a to be serviced by a different network provider i.e., by the core network 120n. The NSRE 154 may trigger the change based on any condition such as a location, a time, and/or QoS.

At 406, when the trigger happens, the NSRE 154 sends a command, to the NSF 162, to change to the core network 120n provided by a different network operator.

At 408, the NSF 162 sends a request to the SM-SR service 140 to change from the first core network 120a to the nth core network 120n (change from the first network operator to the second network operator).

At 410, the SM-SR service 140 triggers profile operator change in the UE 110a. The UE 110a is instructed to disable the first profile for connecting to the first core network 120a and to enable the second profile for connection to the second core network 120n.

At 412, the UE 110a registers with the core network 120n provided by the second operator via the AMF 124n over a default network slice s-NSSAI. The AMF 124n notifies the NEF 128n of the presence of the UE 110a in the core network 120n.

At 414, the NEF 128n sends a new location notification for the UE 110a to the ULF 152.

At 416, the ULF 152 updates the NSRE 154 with the new location of the UE 110a.

At 418, based on the available federated network slices in the NS Repository 156 and one or more location-based rules, the NSRE 154 selects a federated network slice (new s-NSSAI). The NSRE 154 triggers a network slice change by providing the new s-NSSAI for the UE 110a to the NSF 162.

At 420, the NSF 162 communicates with the NEF 128n of the core network 120n associated with the selected federated network slice and provides a network slice update for the UE 110a. The update includes the new s-NSSAI (the selected federated network slice) assigned to the UE 110a.

At 422, the NEF 128n updates the UDM 130n with new UE configuration (the new s-NSSAI) for the UE 110a.

At 424, the UDM 130n provides, to the AMF 124n, a UDM notification for a change in network slices (to the new s-NSSAI).

At 426, the AMF 124n sends, to the UE 110a, a UE configuration update command that includes information identifying the selected federated network slice (the new s-NSSAI).

At 428, the UE 110a re-registers to the selected federated network slice (target network slice identified with the new s-NSSAI) of the core network 120n.

Accordingly, the techniques described above allow an enterprise to build a network slice repository that has federated network slices across various network operators. A network slice repository stores federated network slices provided by different network operators and available to the devices associated with an enterprise such as user devices and/or IoT devices.

The techniques provide for the devices associated with the enterprise to move to a better network slice based on cost, time, QoS, and availability parameters without any manual intervention. The techniques provide network slice switching based on flexible rule definitions managed by an enterprise. The techniques for network slice switching are deployed for both standard SIM and e-SIM operated devices.

The techniques provide for network slice management across different network operators unlike a network slice management function (NSMF) and network slice subnet management function (NSSMF) of the 5G network defined in the 3GPP specification that only manage slices of one specific network operator.

Further, the techniques are deployed at an enterprise level (i.e., at the CSMF 150) for selecting a network slice regardless of the network operator. The techniques integrate with NEFs of various core networks as opposed to the NSMF. That is, the required information (parameters of the devices) is obtained from the NEFs of various core networks. Further, the network slice switching is triggered based on an update of the device details in the UDMs rather than using the NSMF.

The techniques provide enterprises with flexibility to choose network slices across various network operators for their devices. The techniques further define rule-based network slice allocation and management for an enterprise user and extend or utilize functionality of the NSMF to provide further control for an enterprise user. For example, a network slice managed by the NSMF determines health of a network slice based on specific performance criteria that can be common for other enterprise users sharing the same network slice. The NSMF is not able to differentiate one enterprise user with another or provide switching based on enterprise specific requirements such as enterprise specific SLAs. In these techniques, the CSMF 150 is deployed at a layer above the NSMF and provides extended granularity and specificity to enterprise requirements. Unlike the NSMF, the CSMF 150 may define flexible rules to change network slices based on time and location. Further, unlike the NSMF and NSSMF that are used for life cycle management of network slices, the CSMF 150 utilizes already existing network slices of various core networks.

One or more example embodiments allow for enterprises to define business requirements based on location, time, cost, and QoS parameters and then seamlessly switch its devices to various federated network slices of various network operators "on demand" to satisfy the business requirements. The devices associated with an enterprise are switched to a best available federated network slice under various conditions to provide uninterrupted connectivity, capacity, and bandwidth.

Figure 5:
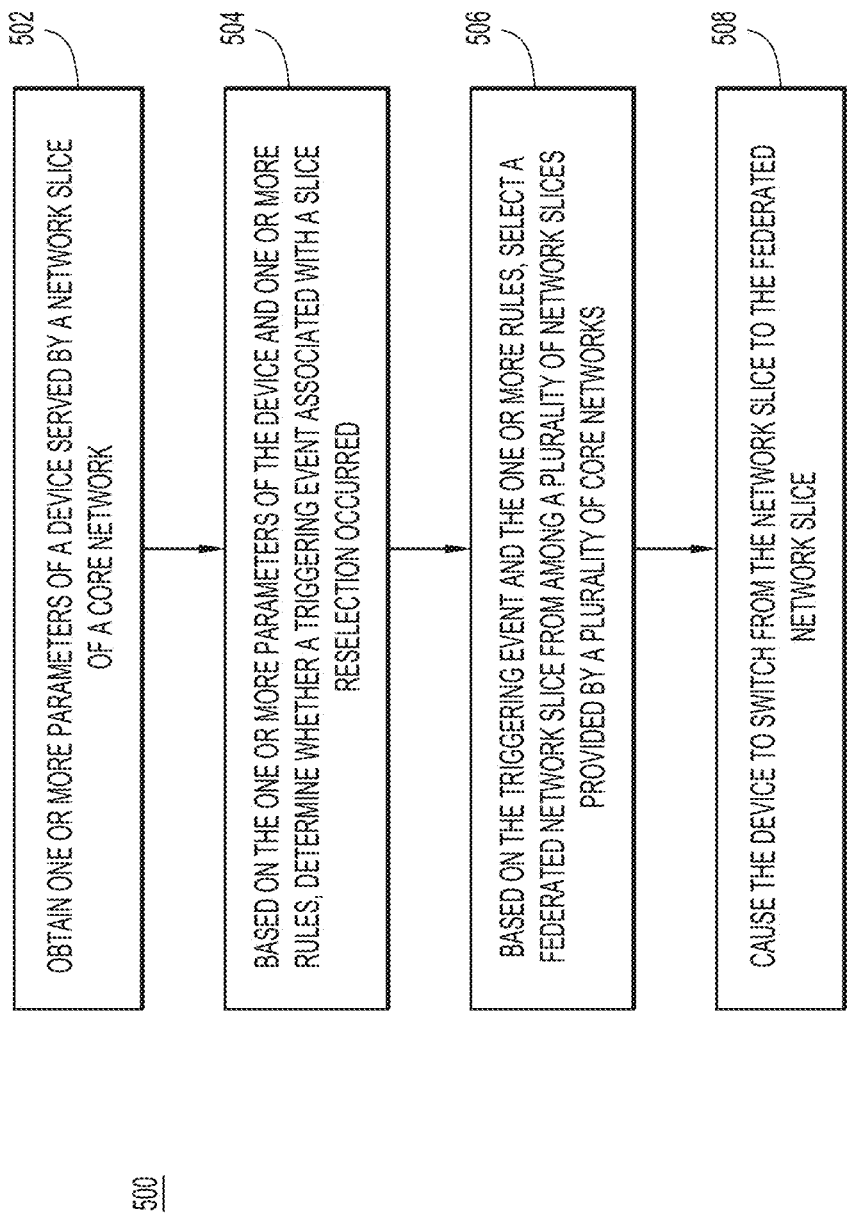
FIG. 5 is a flowchart illustrating a method of switching a device to a federated network slice, according to an example embodiment.

FIG. 5 is a flowchart illustrating a method 500 of switching a device to a federated network slice, according to an example embodiment. The method 500 is performed by a controller of an enterprise such as the CSMF 150 depicted in FIGS. 1, 3A, 3B, and 4.

At 502, a controller of an enterprise obtains one or more parameters of a device served by a network slice of a core network.

At 504, based on the one or more parameters of the device and one or more rules, the controller determines whether a triggering event associated with a slice reselection occurred.

At 506, based on the triggering event and the one or more rules, the controller selects, a federated network slice from among a plurality of network slices provided by a plurality of core networks.

At 508, the controller causes the device to switch from the network slice to the federated network slice.

According to one or more example embodiments, the plurality of core networks may be provided by different network operators. The method 500 may further include obtaining, by the controller from each of the different network operators, information about one or more network slices available in a respective core network of the plurality of core networks and storing, in a network slice repository, the information about the one or more network slices. The information may include for each of the one or more network slices, a location identifier, a network operator identifier, and a slice type.

In one form, the selecting operation 506 may include the controller determining the slice type for the triggering event based on the rules and selecting the federated network slice based on the information in the network slice repository and the slice type for the triggering event.

In one instance, the method 500 may further include the controller configuring the network slice repository based on availability of the one or more network slices in terms of location, time, and quality of service level and periodically synchronizing the network slice repository with the information about the one or more slices provided by the different network operators.

According to one or more example embodiments, the obtaining operation 502 may include obtaining, by the controller from a network execution function or a charging function of the core network, at least one of a location of the device or quality of service information including one or more of bit rate, data volume, latency, or capacity.

According to one or more example embodiments, the method 500 may further include defining, by the controller, the one or more rules of the enterprise. The one or more rules may include at least one of a time-based network slice requirement, a location-based network slice requirement, or a quality of service-based network slice requirement.

In one form, the causing operation 508 may include providing, to a network execution function of a respective core network that provides the federated network slice, a first identifier of the federated network slice and a second identifier of the device such that the network execution function updates a unified data management of the respective core network and triggers switching of the device to the federated network slice.

In another form, the causing operation 508 may include providing, to a subscription manager secure routing service, a request to switch the device to another core network that provides the federated network slice such that the subscription manager secure routing service provisions the device to disable a first profile for connecting to the core network and to enable a second profile for connecting with the another core network. The causing operation 508 may further include providing, to a network execution function of the another core network, a first identifier of the federated network slice and a second identifier of the device such that the network execution function updates a unified data management of the respective core network and triggers switching of the device from a default network slice of the another core network to the federated network slice.

Figure 6:
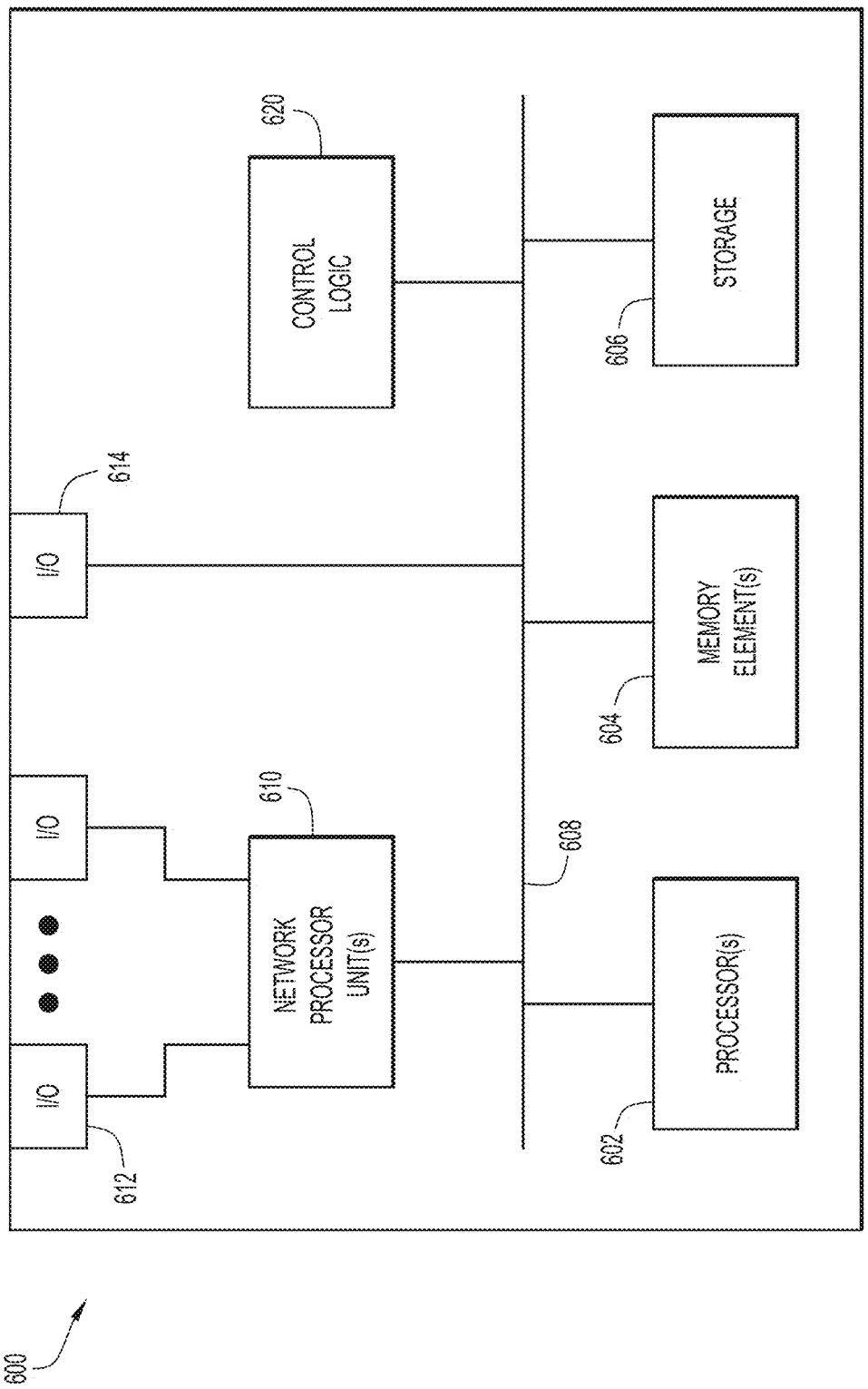
FIG. 6 is a hardware block diagram of a computing device configured to switch a device to a federated network slice according to a network event, according to various example embodiments.

Reference is now made to FIG. 6. FIG. 6 illustrates a hardware block diagram of a computing device 600 that may perform the functions discussed herein in connection with the techniques depicted in FIGS. 1-5. In various embodiments, a computing device, such as computing device 600 or any combination of computing devices 600, may be configured as any entity/entities as discussed for the techniques depicted in connection with FIGS. 1-5 in order to perform operations of the various techniques discussed herein.

In at least one embodiment, computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory elements 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, and/or any other I/O port(s) now known or hereafter developed. Thus, the network processor unit(s) 610 and/or network I/O interfaces 612 may include suitable interfaces for receiving, transmitting, and/or otherwise communicating data and/or information in a network environment.

I/O interface(s) 614 allow for input and output of data and/or information with other entities that may be connected to computer device 600. For example, I/O interface(s) 614 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In still another example embodiment, an apparatus is a controller implementing the CSMF 150 described in FIGS. 1, 3A, 3B and 4. The apparatus includes a communication interface configured to enable network communications, a memory configured to store executable instructions, and a processor coupled to the communication interface and the memory. The processor is configured to perform operations that include obtaining one or more parameters of a device served by a network slice of a core network. The operations further include, based on the one or more parameters of the device and one or more rules of an enterprise, determining whether a triggering event associated with a slice reselection occurred and based on the triggering event and the one or more rules, selecting a federated network slice from among a plurality of network slices provided by a plurality of core networks. The operations further include causing the device to switch from the network slice to the federated network slice.

According to one or more example embodiments, the plurality of core networks may be provided by different network operators. The processor may further be configured to obtain, from each of the different network operators, information about one or more network slices available in a respective core network of the plurality of core networks and to store, in a network slice repository, the information about the one or more network slices, wherein the information includes for each of the one or more network slices, a location identifier, a network operator identifier, and a slice type.

In one form, the processor may be configured to select the federated network slice by determining the slice type for the triggering event based on the rules and by selecting the federated network slice based on the information in the network slice repository and the slice type for the triggering event.

According to one or more example embodiments, the processor may further be configured to configure the network slice repository based on availability of the one or more network slices in terms of location, time, and quality of service level. Additionally, the processor may further be configured to periodically synchronize the network slice repository with the information about the one or more slices provided by the different network operators.

In one instance, the processor may be configured to obtain the one or more parameters by obtaining, from a network execution function or a charging function of the core network, at least one of a location of the device or quality of service information including one or more of bit rate, data volume, latency, or capacity.

According to one or more example embodiments, the processor may further be configured to define the one or more rules of the enterprise. The one or more rules may include at least one of a time-based network slice requirement, a location-based network slice requirement, or a quality of service-based network slice requirement.

In one instance, the processor may be configured to cause the device to switch to the federated network slice by providing, to a network execution function of a respective core network that provides the federated network slice, a first identifier of the federated network slice and a second identifier of the device such that the network execution function updates a unified data management of the respective core network and triggers switching of the device to the federated network slice.

In another instance, the processor may be configured to cause the device to switch to the federated network slice by providing, to a subscription manager secure routing service, a request to switch the device to another core network that provides the federated network slice such that the subscription manager secure routing service provisions the device to disable a first profile for connecting to the core network and to enable a second profile for connecting with the another core network and by providing, to a network execution function of the another core network, a first identifier of the federated network slice and a second identifier of the device such that the network execution function updates a unified data management of the respective core network and triggers switching of the device from a default network slice of the another core network to the federated network slice.

In yet another example embodiment, one or more non-transitory computer readable storage media encoded with instructions are provided. When the media is executed by the processor, the instructions cause the processor to perform the operations including obtaining one or more parameters of a device served by a network slice of a core network. The operations further include, based on the one or more parameters of the device and one or more rules of an enterprise, determining whether a triggering event associated with a slice reselection occurred and based on the triggering event and the one or more rules, selecting a federated network slice from among a plurality of network slices provided by a plurality of core networks. The operations further include causing the device to switch from the network slice to the federated network slice.

According to one or more example embodiments, the plurality of core networks may be provided by different network operators. The instructions may further cause the processor to perform additional operations of obtaining, from each of the different network operators, information about one or more network slices available in a respective core network of the plurality of core networks and storing, in a network slice repository, the information about the one or more network slices. The information may include for each of the one or more network slices, a location identifier, a network operator identifier, and a slice type.

In one form, the instructions may further cause the processor to select the federated network slice by determining the slice type for the triggering event based on the rules and selecting the federated network slice based on the information in the network slice repository and the slice type for the triggering event.

In one instance, the instructions may further cause the processor to perform additional operations of configuring the network slice repository based on availability of the one or more network slices in terms of location, time, and quality of service level and periodically synchronizing the network slice repository with the information about the one or more slices provided by the different network operators.

In yet another example embodiment, a system is provided that includes the devices and operations explained above with reference to FIGS. 1-6.

The programs described herein (e.g., control logic 620) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or nonvolatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 606 and/or memory elements(s) 604 can store data, software, code, instructions (e.g., processor instructions), logic, parameters, combinations thereof, and/or the like used for operations described herein. This includes the storage 606 and/or memory elements(s) 604 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of and 'one or more of' can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    obtaining, by a controller, information about a plurality of network slices available in a plurality of core networks provided by different network operators;
    storing, in a network slice repository, the information about the plurality of network slices, wherein the information includes for each federated network slice of the plurality of network slices, a location identifier, a network operator identifier, and a slice type; and
    causing, by the controller, a device to switch from a network slice to a federated network slice based at least in part on the information.

2. The method of claim 1, wherein causing the device to switch to the federated network slice is further based on one or more of an enterprise rule or a triggering event defined by an enterprise.

3. The method of claim 2, further comprising:
    selecting the federated network slice from the plurality of network slices based on the information in the network slice repository and the slice type defined for the triggering event.

4. The method of claim 2, further comprising:
    defining, by the controller, one or more enterprise rules, wherein the one or more enterprise rules include at least one of a time-based network slice requirement, a location-based network slice requirement, or a quality of service-based network slice requirement.

5. The method of claim 1, further comprising:
    configuring, by the controller, the network slice repository based on availability of one or more network slices in terms of location, time, and quality of service level; and
    periodically synchronizing, by the controller, the network slice repository with the information about the one or more network slices provided by the different network operators.

6. The method of claim 1, wherein causing the device to switch to the federated network slice includes:
    providing, to a network execution function of a respective core network that provides the federated network slice, a first identifier of the federated network slice and a second identifier of the device such that the network execution function updates a unified data management of the respective core network and triggers switching of the device to the federated network slice.

7. The method of claim 1, wherein causing the device to switch to the federated network slice includes:
    providing, to a subscription manager secure routing service, a request to switch the device to another core network that provides the federated network slice such that the subscription manager secure routing service provisions the device to disable a first profile for connecting to the core network and to enable a second profile for connecting with the another core network; and
    providing, to a network execution function of the another core network, a first identifier of the federated network slice and a second identifier of the device such that the network execution function updates a unified data management of a respective core network and triggers switching of the device from a default network slice of the another core network to the federated network slice.

8. The method of claim 1, further comprising:
obtaining one or more parameters of the device, which include a change in a location of the device based on which the device is switched to a default network slice available for the location,
wherein causing the device to switch to the federated network slice includes causing the device to switch from the default network slice for the location to the federated network slice based on one or more enterprise rules.

9. An apparatus comprising:
a communication interface configured to enable network communications;
a memory configured to store executable instructions; and
a processor coupled to the communication interface and the memory and configured to perform operations including:
obtaining information about a plurality of network slices available in a plurality of core networks provided by different network operators;
storing, in a network slice repository, the information about the plurality of network slices, wherein the information includes for each federated network slice of the plurality of network slices, a location identifier, a network operator identifier, and a slice type; and
causing a device to switch from a network slice to a federated network slice based at least in part on the information.

10. The apparatus of claim 9, wherein the processor causes the device to switch to the federated network slice is further based on one or more of an enterprise rule or a triggering event defined by an enterprise.

11. The apparatus of claim 10, wherein the processor is further configured to perform an operation comprising:
selecting the federated network slice from the plurality of network slices based on the information in the network slice repository and the slice type defined for the triggering event.

12. The apparatus of claim 10, wherein the processor is further configured to perform an operation comprising:
defining one or more enterprise rules, wherein the one or more enterprise rules include at least one of a time-based network slice requirement, a location-based network slice requirement, or a quality of service-based network slice requirement.

13. The apparatus of claim 9, wherein the processor is further configured to perform additional operations comprising:
configuring the network slice repository based on availability of one or more network slices in terms of location, time, and quality of service level; and
periodically synchronizing the network slice repository with the information about the one or more network slices provided by the different network operators.

14. The apparatus of claim 9, wherein the processor is configured to cause the device to switch to the federated network slice by:
providing, to a network execution function of a respective core network that provides the federated network slice, a first identifier of the federated network slice and a second identifier of the device such that the network execution function updates a unified data management of the respective core network and triggers switching of the device to the federated network slice.

15. The apparatus of claim 9, wherein the processor is configured to cause the device to switch to the federated network slice by:
providing, to a subscription manager secure routing service, a request to switch the device to another core network that provides the federated network slice such that the subscription manager secure routing service provisions the device to disable a first profile for connecting to the core network and to enable a second profile for connecting with the another core network; and
providing, to a network execution function of the another core network, a first identifier of the federated network slice and a second identifier of the device such that the network execution function updates a unified data management of a respective core network and triggers switching of the device from a default network slice of the another core network to the federated network slice.

16. The apparatus of claim 9, wherein the processor is further configured to perform an additional operation comprising:
obtaining one or more parameters of the device, which include a change in a location of the device based on which the device is switched to a default network slice available for the location,
wherein causing the device to switch to the federated network slice includes causing the device to switch from the default network slice for the location to the federated network slice based on one or more enterprise rules.

17. One or more non-transitory computer readable storage media encoded with instructions that, when executed by a processor, cause the processor to perform operations including:
obtaining information about a plurality of network slices available in a plurality of core networks provided by different network operators;
storing, in a network slice repository, the information about the plurality of network slices, wherein the information includes for each federated network slice of the plurality of network slices, a location identifier, a network operator identifier, and a slice type; and
causing a device to switch from a network slice to a federated network slice based at least in part on the information.

18. The one or more non-transitory computer readable storage media according to claim 17,
wherein the instructions cause the processor to switch the device to the federated network slice is further based on one or more of an enterprise rule or a triggering event defined by an enterprise.

19. The one or more non-transitory computer readable storage media according to claim 18,
wherein the instructions further cause the processor to perform an additional operation comprising:
selecting the federated network slice from the plurality of network slices based on the information in the network slice repository and the slice type defined for the triggering event.

20. The one or more non-transitory computer readable storage media according to claim 18, wherein the instructions further cause the processor to perform an additional operation comprising:
defining one or more enterprise rules, wherein the one or more enterprise rules include at least one of a time-based network slice requirement, a location-based network slice requirement, or a quality of service-based network slice requirement.

\* \* \* \* \*